United States Patent
Xu (10) Patent No.: US 7,511,436 B2
(45) Date of Patent: Mar. 31, 2009

(54) CURRENT CONTROL METHOD AND CIRCUIT FOR LIGHT EMITTING DIODES

(75) Inventor: Peng Xu, Danbury, CT (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 354 days.

(21) Appl. No.: 10/555,680

(22) PCT Filed: Apr. 30, 2004

(86) PCT No.: PCT/IB2004/001456

§ 371 (c)(1),
(2), (4) Date: Nov. 4, 2005

(87) PCT Pub. No.: WO2004/100614

PCT Pub. Date: Nov. 18, 2004

(65) Prior Publication Data

US 2006/0267514 A1 Nov. 30, 2006

Related U.S. Application Data

(60) Provisional application No. 60/468,553, filed on May 7, 2003.

(51) Int. Cl.
*G05F 1/00* (2006.01)

(52) U.S. Cl. ............... 315/307; 315/291; 315/247; 315/224; 315/185 S (58) Field of Classification Search ............... 315/291, 315/307–311, 297, 224, 225, 247, 246, 312
See application file for complete search history.

(56) References Cited

U.S. PATENT DOCUMENTS

| 4,504,776 | A | 3/1985 | Haville |
| 6,153,985 | A | 11/2000 | Grossman |
| 6,400,101 | B1 | 6/2002 | Biebl et al. |
| 6,441,557 | B1 | 8/2002 | Asakura |
| 6,515,434 | B1 | 2/2003 | Beibl |
| 2002/0140371 | A1 * | 10/2002 | Chou et al. ............ 315/224 |
| 2004/0251854 | A1 * | 12/2004 | Matsuda et al. ........ 315/291 |
| 2006/0055342 | A1 * | 3/2006 | Suzuki et al. .......... 315/291 |

FOREIGN PATENT DOCUMENTS

EP   1001516 A2   5/2000
WO   WO01/69980 A1   9/2001

* cited by examiner

*Primary Examiner*—Tuyet Vo (57) ABSTRACT

A flow of a LED current (ILED2) through one or more LEDs is controlled by a LED current control circuit (50-54) implementing a method (30) that is independent of an input line and a load of the LED(s).

10 Claims, 11 Drawing Sheets

CURRENT CONTROL METHOD AND CIRCUIT FOR LIGHT EMITTING DIODES

CROSS REFERENCE TO RELATED APPLICATION

This application claims the benefit of U.S. provisional application Ser. No.60/468,553, filed May 7, 2003, which the entire subject matter is incorporated herein by reference.

The present invention generally relates to various methods and circuits for controlling a light emitting diode ("LED") current. The present invention specifically relates to a regulation of a peak amperage and a valley amperage of a LED current LEDs are being used more and more in various applications such as, for example, backlighting, traffic lights, signage, automobiles and illumination. It is well known that a light output of a LED is directly dependent upon a current flowing through the LED. A LED current control circuit is therefore used to regulate the current flow through the LEDs to ideally maintain a constant current during all operating conditions.

Figure 1:
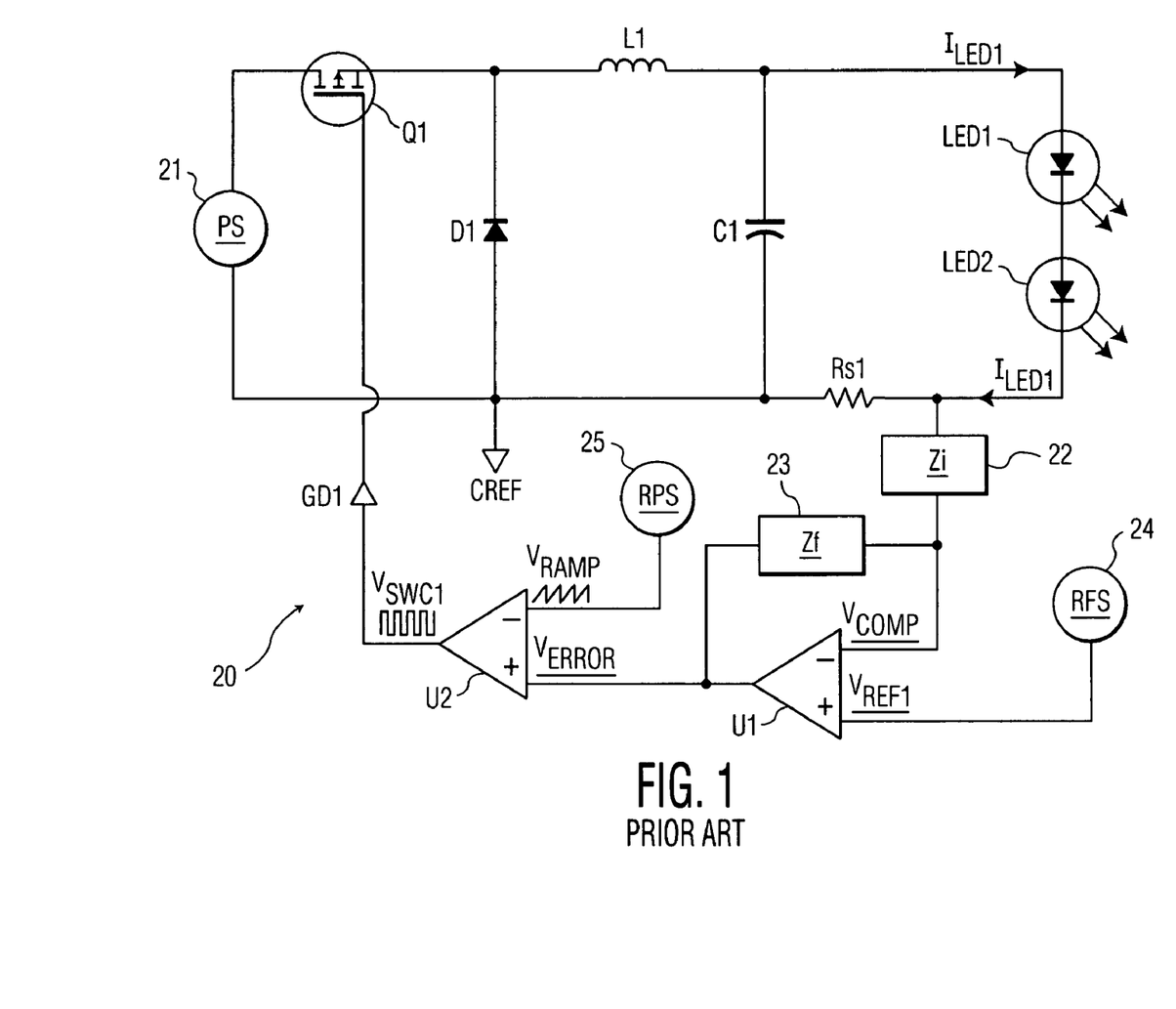
FIG. 1 illustrates a schematic diagram of a known LED current control circuit.

FIG. 1 illustrates a known LED current control circuit 20 employing a MOSFET switch Q1, a diode D1, an inductor output filter L1, and a capacitive output filter C1 for controlling a flow of a LED current $I_{LED1}$ through a LED network LED1, LED2. Whenever MOSFET switch Q1 is turned on, circuit 20 controls an increasing flow of LED current $I_{LED1}$ from a power source ("PS") 21 through LED network LED1, LED2. Whenever MOSFET switch Q1 is turned off, circuit 20 controls a decreasing flow of LED current $I_{LED1}$ through LED network LED1, LED2. This regulation of LED current $I_{LED1}$ is accomplished by a switch control circuit that employs an operational amplifier U1, a pulse width modulation ("PWM") comparator U2, a gate driver GD1, a sense resistor Rs1, and a compensation RC network including an input impedance ("Zi") 22, and a feedback impedance ("Zf") 23.

In operation, a compensation voltage $V_{COMP}$ generated by input impedance 22 and feedback impedance 23 is applied to an inverting input of operational amplifier U1, and a reference voltage $V_{REF1}$ as supplied by a reference voltage source ("RFS") 24 is applied to a non-inverting input of operational amplifier U1. Operational amplifier U1 compares compensation voltage $V_{COMP}$ and reference voltage $V_{REF1}$ to yield an error voltage $V_{ERROR}$, which is an enlarged difference between compensation voltage $V_{COMP}$ and reference voltage $V_{REF1}$ that is applied to a non-inverting input of PWM comparator U2. A ramp voltage $V_{RAMP}$ as supplied by a ramp voltage source ("RPS") 25 is applied at an inverting input of comparator U2, which compares error voltage $V_{ERROR}$ and ramp voltage $V_{RAMP}$ to yield a switching control voltage $V_{SWC1}$ for periodically enabling and disabling MOSFET switch Q1 via gate driver GD1.

Figure 2:
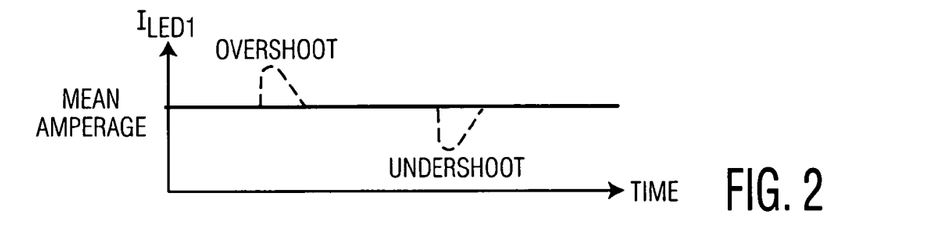
FIG. 2 illustrates a graphical representation of a mean amperage of a LED current controlled by the LED current control circuit illustrated in FIG. 1.

Ideally, the aforementioned current regulation of LED current $I_{LED}$ maintains LED current $I_{LED1}$ at a mean amperage as illustrated in FIG. 2. However, due to an implementation of a $2^{nd}$ order feedback control as illustrated in FIG. 1, LED current $I_{LED1}$ can experience an overshoot or an undershoot as illustrated in FIG. 2 whenever a change occurs in the input line of power source PS or in a load of the LED network LED1, LED2. Furthermore, LEDs are frequently non-linear devices, which makes it difficult to design the RC network for optimal performance.

The present invention addresses the shortcomings with the prior art by providing a LED current control method and circuit for accurately and quickly regulating the mean amperage of LED current $I_{LED}$ during all operating conditions including a change in the input line of a power source or in a change in a load of the LED network.

One form of the present invention is a LED current control method for regulating a peak amperage and a valley amperage of a LED current flowing through one or more LEDs. First, an upper trip voltage and a lower trip voltage are established as control crossover thresholds, and a LED current sensing voltage representative of a flow of the LED current through the LED(S) is established. Second, a control of an increase in the LED current from the valley amperage to the peak amperage occurs in response to each crossover of the lower trip voltage by the LED current sensing voltage in a negative direction, and a control of a decrease of the LED current from the peak amperage to the valley amperage occurs in response to each crossover of the upper trip voltage by the LED current sensing voltage in a positive direction.

A second form of the present invention is a LED current control circuit employing a hysteretic comparator, a LED current sensor, and a switch-mode converter for regulating a peak amperage and a valley amperage of a LED current flowing through one or more LEDs. The LED current sensor establishes a LED current sensing voltage representative of a flow of the LED current through the LED(s). The hysteretic comparator establishes an upper trip voltage and a lower trip voltage as control crossover thresholds that are compared to the LED current sensing voltage. The switch-mode converter controls an increase in the LED current from the valley amperage to the peak amperage in response to each crossover of the lower trip voltage by the LED current sensing voltage in a negative direction, and controls a decrease of the LED current from the peak amperage to the valley amperage in response to each crossover of the upper trip voltage by the LED current sensing voltage in a positive direction.

The foregoing forms as well as other forms, features and advantages of the present invention will become further apparent from the following detailed description of the presently preferred embodiments, read in conjunction with the accompanying drawings. The detailed description and drawings are merely illustrative of the present invention rather than limiting, the scope of the present invention being defined by the appended claims and equivalents thereof.

Figure 3:
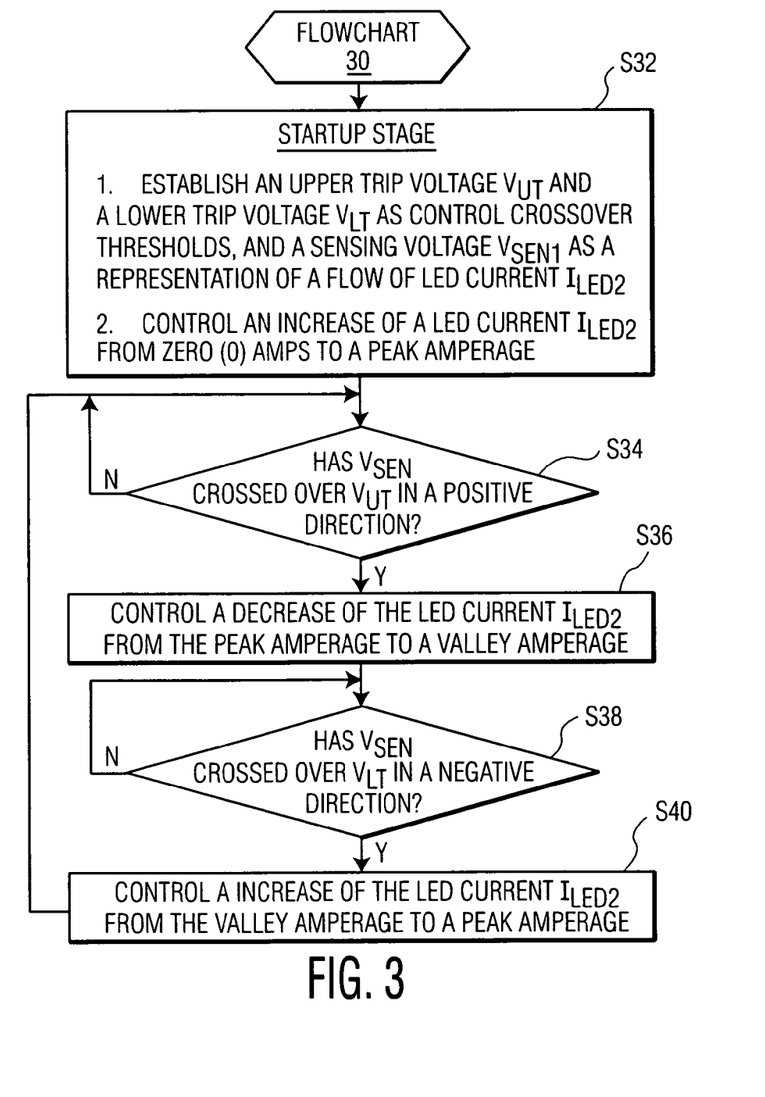
FIG. 3 illustrates a flowchart representative of one embodiment of a LED current control method in accordance with the present invention.
Figure 4:
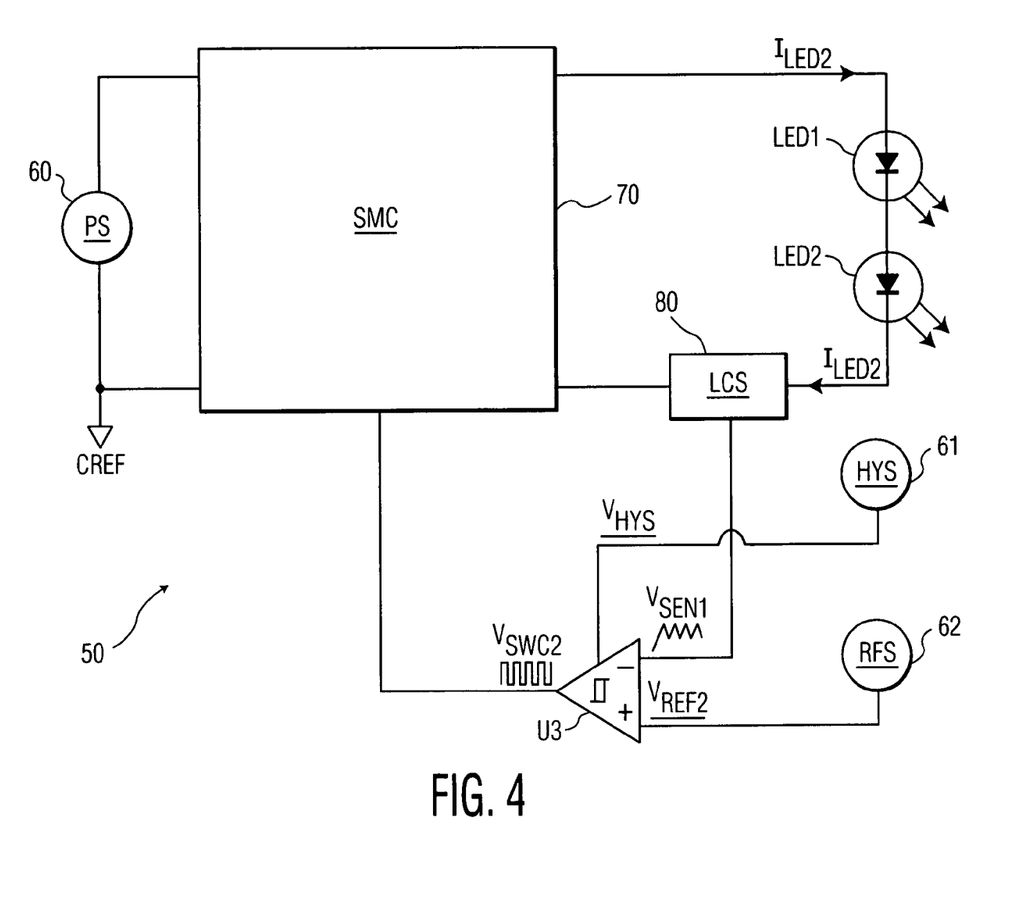
FIG. 4 illustrates a schematic diagram of one embodiment of a LED current control circuit in accordance with the present invention.

A flowchart 30 representative of a LED current control method of the present invention is illustrated in FIG. 3, and a LED current control circuit 50 for implementing flowchart 30 is illustrated in FIG. 4. During a startup stage S32 of flowchart 30, an upper trip voltage $V_{UT}$ and a lower trip voltage $V_{LT}$ are established as control crossover thresholds. This is accomplished by an application of a reference voltage $V_{REF2}$ as supplied by a reference voltage source ("RFS") 62 to a non-inverting input of hysteretic comparator U3, and an application of a hysteresis voltage $V_{HYS}$ as supplied by a hysteresis voltage source ("HYS") 61 to a control input of hysteretic comparator U3. In one embodiment of hysteretic comparator U3, upper trip voltage $V_{UT}$ equals $(V_{REF}+(V_{HYS}/2))$ and a lower trip voltage $V_{LT}$ equals $(V_{REF}-(V_{HYS}/2))$.

Figure 5:
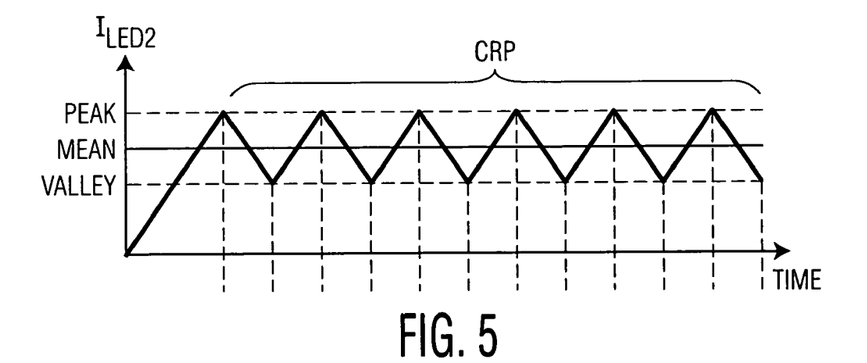
FIG. 5 illustrates an exemplary graphical representation of a LED current controlled by the LED current control circuit illustrated in FIG. 4.
Figure 6:
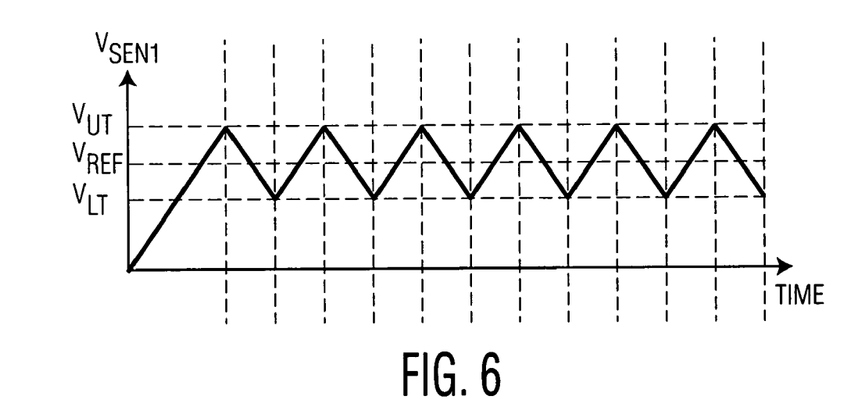
FIG. 6 illustrates an exemplary graphical representation of a LED current sensing voltage generated by the LED current control circuit illustrated in FIG. 4.
Figure 7:
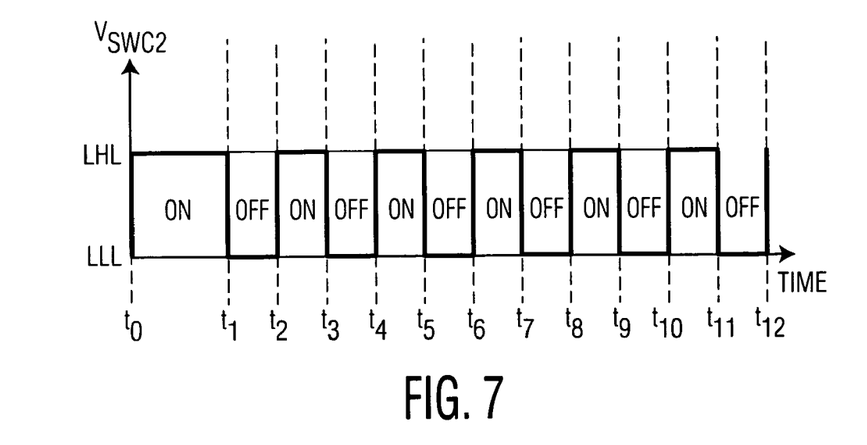
FIG. 7 illustrates an exemplary graphical representation of a switching control voltage generated by the LED current control circuit illustrated in FIG. 4.

In addition, during stage S32, a LED current sensing voltage $V_{SEN1}$ is established as a representation of a sensed flow of a LED current $I_{LED2}$ through LED network LED1, LED2. This is accomplished by a LED current sensor ("LCS") 80, which applies LED current sensing voltage $V_{SEN1}$ to an inverting input of hysteretic comparator U3. At a time $t_0$, LED current $I_{LED}$ is zero (0) amps as illustrated in FIG. 5. LED current sensing voltage $V_{SEN1}$ consequently is zero (0) volts as illustrated in FIG. 6. Also at time $t_0$, hysteretic comparator U3 is initially set to output a switching control voltage $V_{SWC2}$ at a logic high level LHL as illustrated in FIG. 7 and a power source ("PS") 60 is applied to a switch-mode converter ("SMC") 70 whereby switch-mode converter is turned on to initiate a flow of LED current $I_{LED2}$ from power source 60 through LED network LED1, LED2.

Next during startup stage S32, switch-mode converter 70 controls an increase in the flow of LED current $I_{LED2}$ through LED network LED1, LED2 from zero (0) amps at time $t_0$ to the peak amperage at time $t_1$ as illustrated in FIG. 5. LED current sensing voltage $V_{SEN1}$ consequently increases in a positive direction towards upper trip voltage $V_{UT}$ as illustrated in FIG. 6. Upon LED current sensing voltage $V_{SEN1}$ crossing over upper trip voltage $V_{UT}$ during a stage S34 of flowchart 30 at a time $t_1$, hysteretic comparator U3 outputs switching control voltage $V_{SWC2}$ at a logic low level LLL as illustrated in FIG. 7 whereby switch-mode converter 70 is turned off at time $t_1$.

During a stage S36 of flowchart 30, switch-mode converter 70 controls a decrease in the flow of LED current $I_{LED2}$ through the LED network LED1, LED2 from the peak amperage at time $t_1$ to the valley amperage at time $t_2$ as illustrated in FIG. 5. LED current sensing voltage $V_{SEN1}$ consequently decreases in a negative direction towards lower trip voltage $V_{LT}$ as illustrated in FIG. 6. Upon LED current sensing voltage $V_{SEN1}$ crossing over lower trip voltage $V_{LT}$ during a stage S38 of flowchart 30 at a time $t_2$, hysteretic comparator U3 outputs switching control voltage $V_{SWC2}$ at a logic high level LHL as illustrated in FIG. 7 whereby switch-mode converter 70 is turned on at time $t_2$.

During a stage S40 of flowchart 30, switch-mode converter 70 controls of an increase in the flow of LED current $I_{LED2}$ through the LED network LED1, LED2 from the valley amperage at time $t_2$ to the peak amperage at time $t_3$ as illustrated in FIG. 5. LED current sensing voltage $V_{SEN1}$ consequently increases in a positive direction towards upper trip voltage $V_{UT}$ as illustrated in FIG. 6. Upon LED current sensing voltage $V_{SEN1}$ crossing over upper trip voltage $V_{UT}$ during stage S34 at time $t_3$, hysteretic comparator U3 outputs switching control voltage $V_{SWC2}$ at logic low level LLL as illustrated in FIG. 7 whereby switch-mode converter 70 is turned off at time $t_3$.

As long as power source 60 is being applied to switch-mode converter 70, and reference voltage $V_{REF2}$ and hysteresis voltage $V_{HYS}$ are being applied to hysteretic comparator U3, LED current control circuit 50 will continue to cycle through stages S34-S40 of flowchart 30 whereby LED current $I_{LED2}$ continually ramps between the peak amperage and the valley amperage during a current regulation phase CRP as illustrated in FIG. 5. During the current regulation phase CRP, a mean amperage of LED current $I_{LED2}$ is an average of the peak amperage and the valley amperage. As described herein, the peak amperage and the valley amperage are a function of reference voltage $V_{REF2}$ and hysteresis voltage $V_{HYS}$. Consequently, current regulation phase CRP attains a regulation of the mean amperage of LED current $I_{LED2}$ that is accurate during all operating conditions of circuit 50, including a change in the input line of power source 60 or a change in the load of the LED network LED1, LED2.

Referring to FIG. 4, circuit 50 can employ any type of switch-mode converter (e.g., a Buck converter, a Forward converter, a Boost converter, a Flyback converter, a Bridge converter, and a Cuk converter) to serve as switch-mode converter 70. FIGS. 8-14 illustrate various embodiments of switch-mode converter 70.

Figure 8:
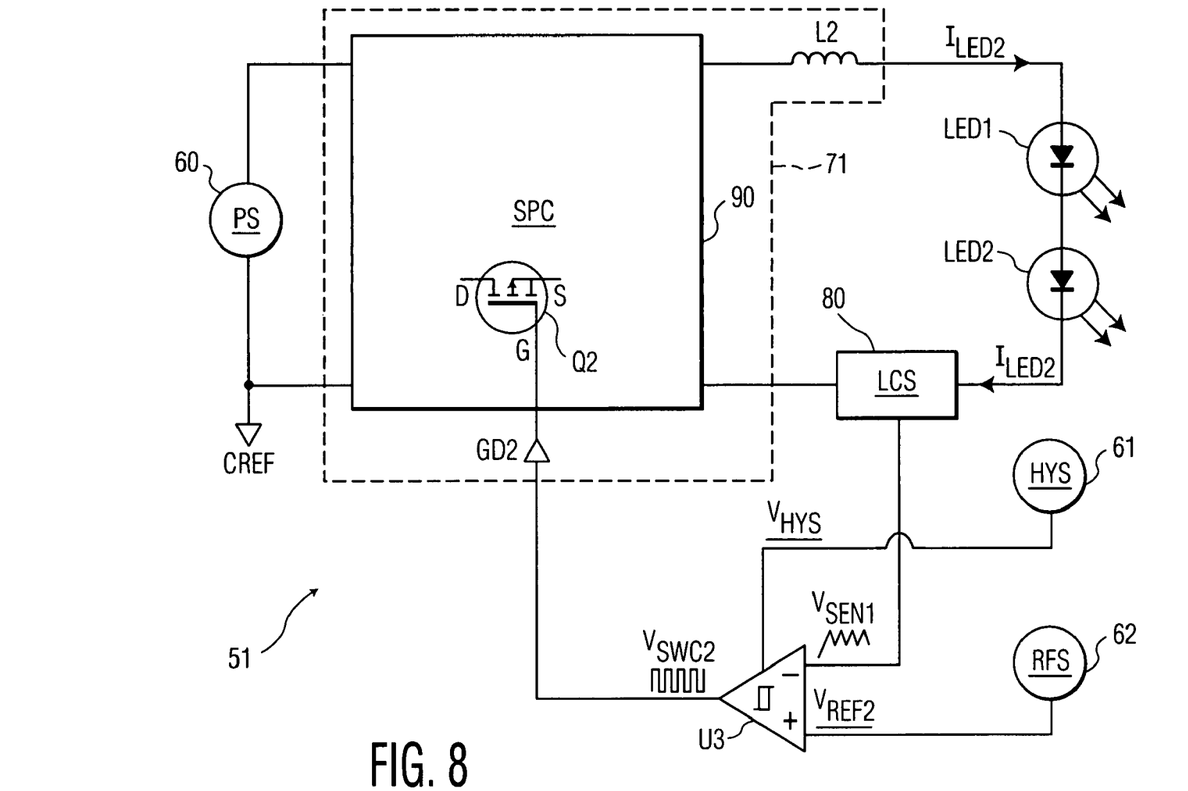
FIG. 8 illustrates a schematic diagram of a first embodiment of the LED current control circuit illustrated in FIG. 4.

FIG. 8 illustrates a LED current control circuit 51 as an inductive output based version of LED current control circuit 50. To implement flowchart 30 (FIG. 3), circuit 51 employs a switch-mode converter 71 including a switching power cell ("SPC") 90, a gate driver GD2, and an inductive output filter L2. Gate driver GD2 is connected to the output of hysteretic comparator U3 and a gate terminal G of MOSFET switch Q2 whereby MOSFET switch Q2 is opened during stage S36 (FIG. 3) and closed during stages S32 and S40 (FIG. 3). Inductive output filter L2 is connected to switching power cell 90 and LED network LED1, LED2 to facilitate switching power cell 90 in the control of the flow of LED current $I_{LED2}$ through LED network LED1, LED2.

Figure 9:
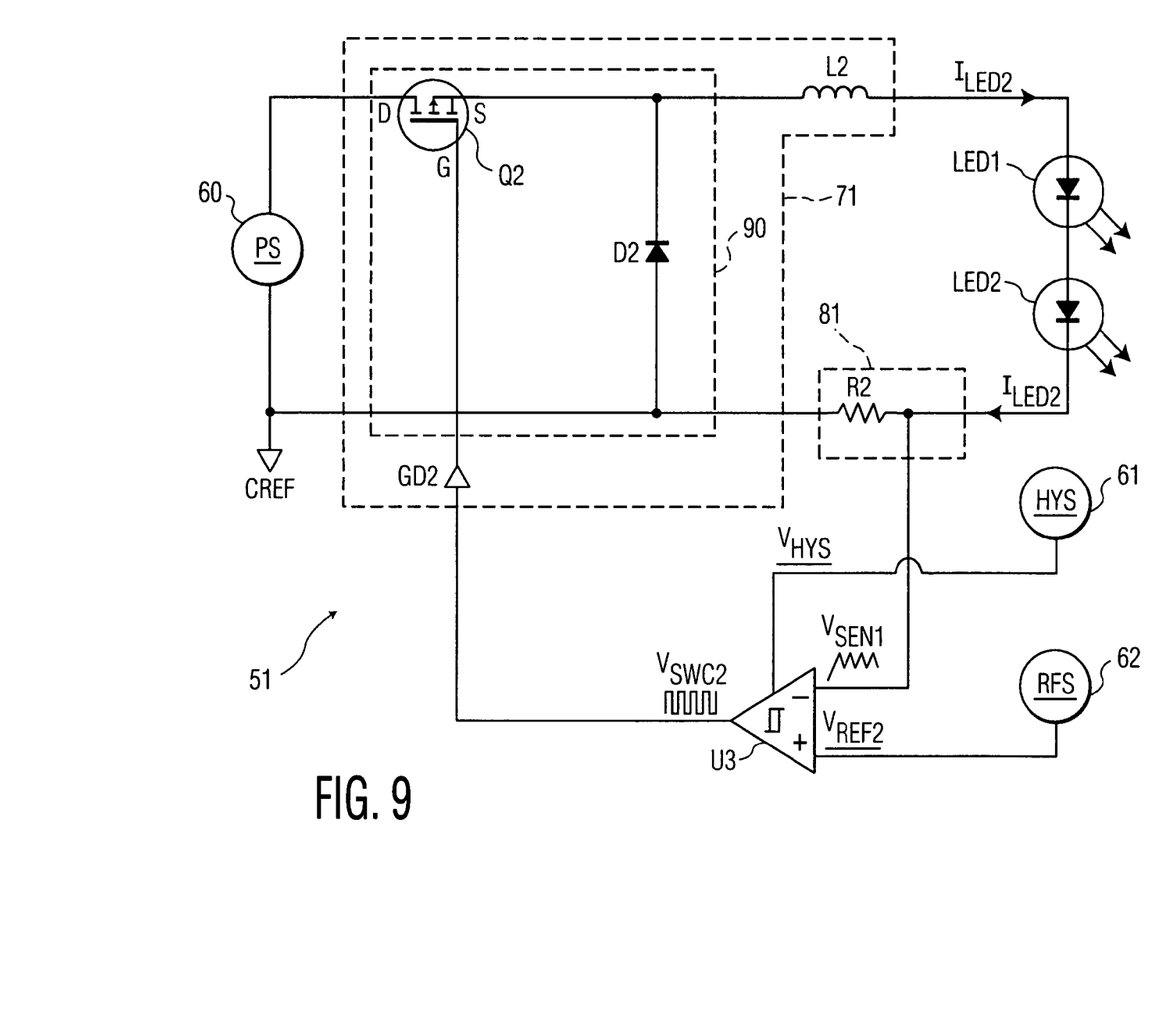
FIG. 9 illustrates a schematic diagram of one embodiment of the LED current control circuit illustrated in FIG. 8.

Switching power cell 90 can include any circuit arrangement encompassing MOSFET switch Q2. FIG. 9 illustrates one such circuit arrangement wherein a drain terminal D of MOSFET switch Q2 is connected to power source 60, and a source terminal S of MOSFET switch Q2 is connected to inductive output filter L2 and a diode D1, which is also connected to a common reference CREF. FIG. 9 also illustrates a LED current sensor 81 as a version of LED current sensor 80 (FIG. 4). LED current sensor 81 includes a resistor R2 having one terminal connected to both LED network LED1, LED2 and the inverting input of hysteretic comparator U3. The other terminal of resistor R2 is connected to common reference CREF. A flow of LED current $I_{LED2}$ through resistor R2 applies LED current sensing voltage $V_{SEN1}$ to the inverting input of hysteretic comparator U3.

Figure 10:
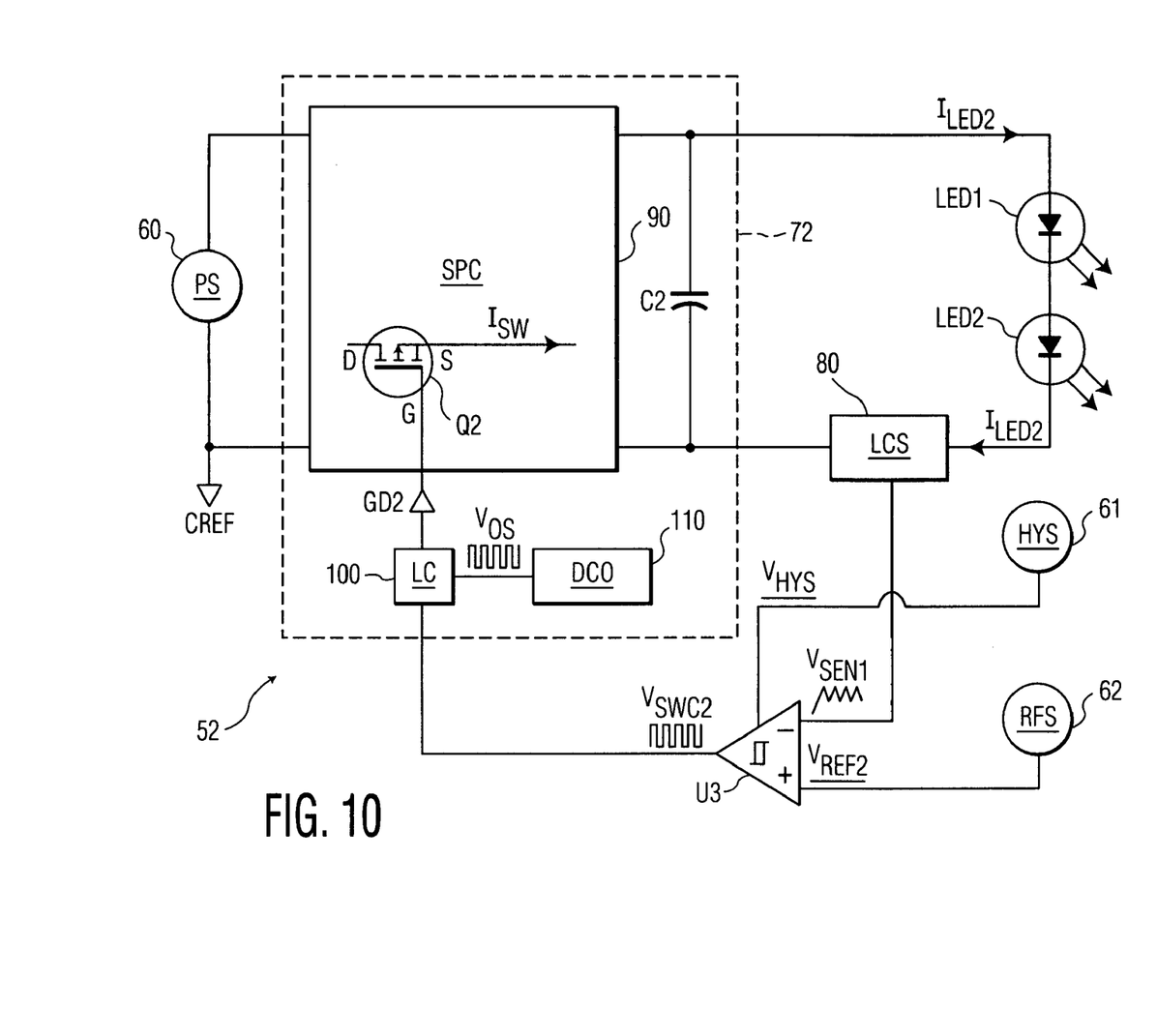
FIG. 10 illustrates a schematic diagram of a second embodiment of the LED current control circuit illustrated in FIG. 4.

FIG. 10 illustrates a LED current control circuit 52 as a capacitive output based version of LED current control circuit 50 (FIG. 8). To implement flowchart 30 (FIG. 3), circuit 52 employs a switch-mode converter 72 including switching power cell 90, a capacitive output filter C2, gate driver GD2, a logic circuit ("LC") 100, and a duty cycle oscillator ("DCO") 110. Logic circuit 100 is connected to hysteretic comparator U3 to thereby receive switching control voltage $V_{SWC2}$. Logic circuit 100 is also connected to duty cycle oscillator 110 to thereby receive oscillating voltage $V_{OS}$. Logic circuit 100 performs a logic operation on switching control voltage $V_{SWC2}$ and oscillating voltage $V_{OS}$ to control an opening and closing of MOSFET switch Q2 via gate driver G2 during stage S32, S36 and S40 (FIG. 3). Duty cycle oscillator 110 controls a duty cycle of oscillating voltage $V_{OS}$ to limit a switching current $I_{SW}$ flowing through MOSFET switch Q2. Capacitive output filter C2 is connected to switching power cell 90 and LED network LED1, LED2 to facilitate switching power cell 90 in the control of the flow of LED current $I_{LED2}$ through LED network LED1, LED2.

Figure 11:
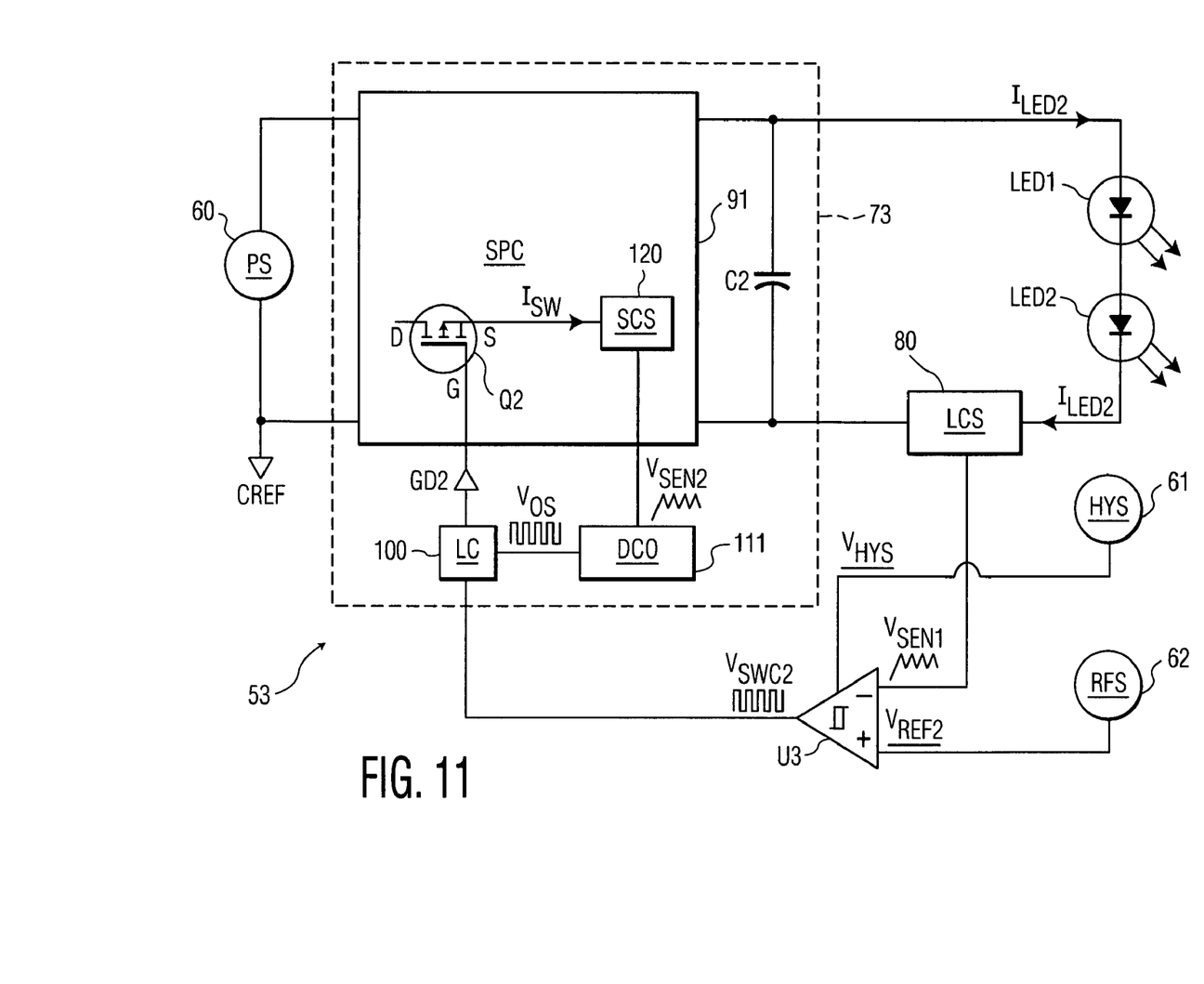
FIG. 11 illustrates a schematic diagram of a third embodiment of the LED current control circuit illustrated in FIG. 4.

FIG. 11 illustrates a LED current control circuit 53 as an alternative version of LED current control circuit 52. Circuit 53 employs a switch-mode converter 73 including a switching power cell 91 having MOSFET switch Q2 and a switching current sensor ("SCS") 120 for providing a switching current sensing voltage $V_{SNE2}$ to a duty cycle oscillator 111. Switching current sensing voltage $V_{SNE2}$ is a representation of switching current $I_{SW}$ that enables duty cycle oscillator 111 to output oscillating voltage $V_{OS}$ with a duty cycle that limits switching current $I_{SW}$.

Figure 12:
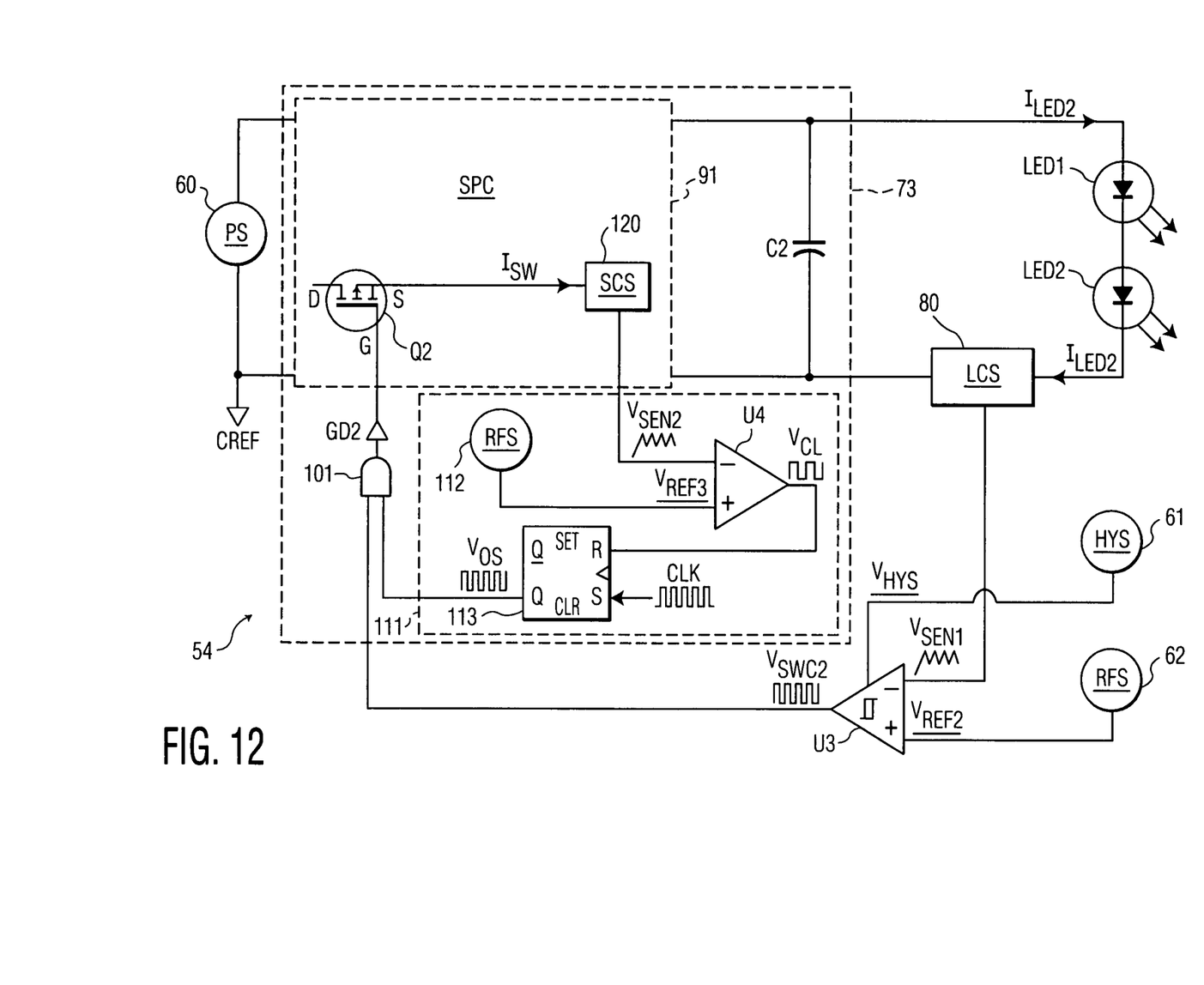
FIG. 12 illustrates a schematic diagram of one embodiment of the LED current control circuit illustrated in FIG. 11.

Referring to FIGS. 10 and 11, the switch-mode converters can employ any type of logic circuit and duty cycle oscillator. FIG. 12 illustrates a LED current control circuit 54 employing a switch-mode converter 74 including a logic circuit in the form of an AND gate 101 and one version of duty cycle oscillator 111, which employs a comparator U4, a reference voltage source 112 and a bi-stable device in the form of a RS flip-flop 113. Switch current sensor 120 applies switching current sensing voltage $V_{SNE2}$ to an inverting input of a comparator U4. Reference voltage source 112 applies a reference voltage $V_{REF2}$ to a non-inverting input of comparator U4, where reference voltage $V_{REF2}$ is a representation of a maximum amperage for switching current $I_{SW}$. An output of comparator U4 applies a switching current limit voltage $V_{CL}$ to R input terminal of RS flip-flop 113. A clock CLK is applied to S input terminal of RS flip-flop 113. Q output terminal of RS flip-flop 113 is applied to a first input of AND gate 101, which receives switching control voltage $V_{SWC2}$ at a second input. An output of AND gate 101 is connected to gate driver GD2.

Referring to FIGS. 11 and 12, switching power cell 91 can include any circuit arrangement encompassing MOSFET switch Q2 and switching current sensor 120.

Figure 13:
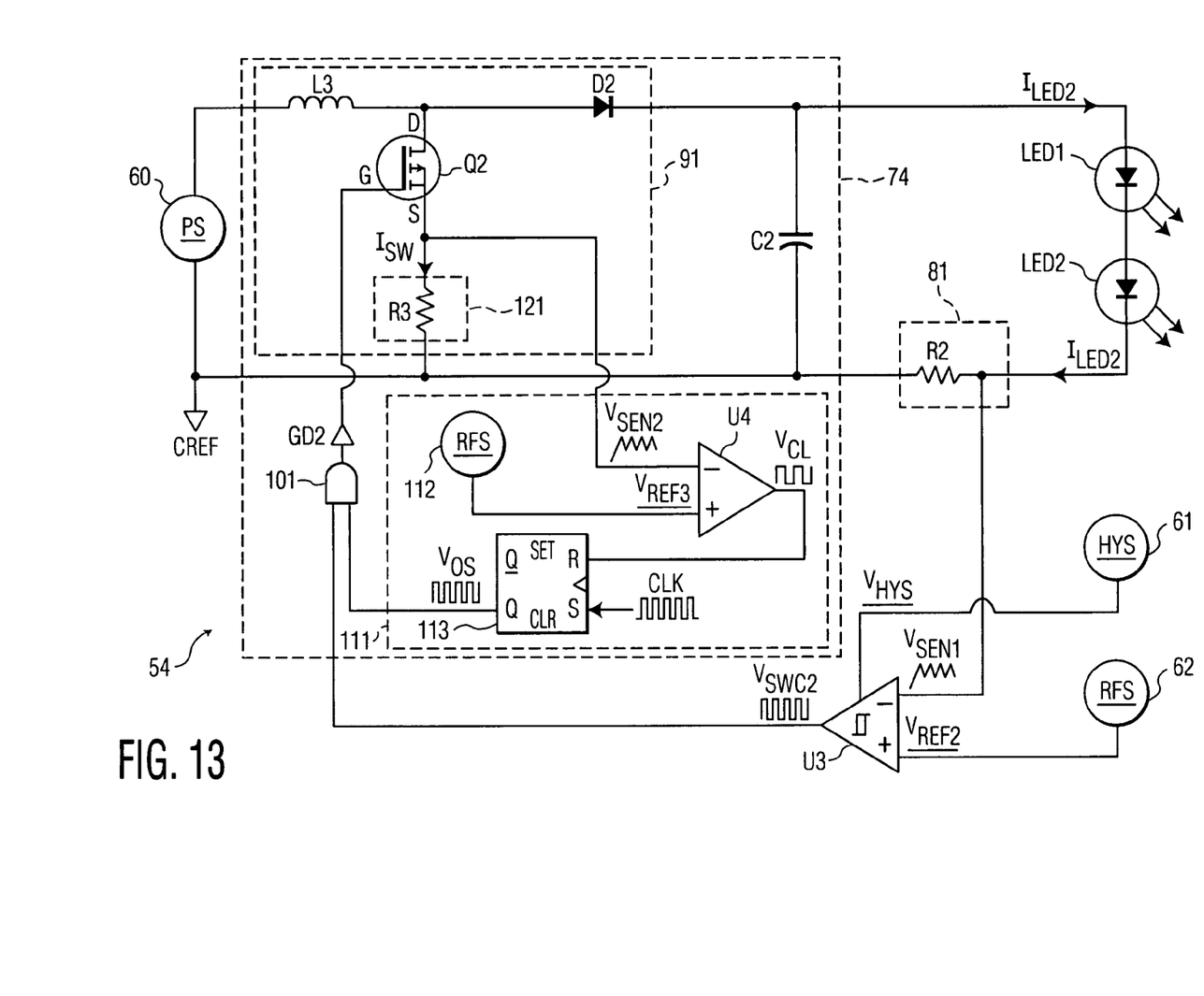
FIG. 13 illustrates a schematic diagram of a first embodiment of the LED current control circuit illustrated in FIG. 12.

FIG. 13 illustrates one circuit arrangement of cell 91 wherein an inductor L3 is connected to power source 60 and a drain terminal D of MOSFET switch Q2. A diode D2 is connected to drain terminal D of MOSFET switch Q2. Diode D2 is also connected to capacitive output filter C2 and LED network LED1, LED2. A switching current sensor 121 in the form of a resistor R3 is connected to a source terminal S of MOSFET switch Q2 and common reference CREF. The source terminal S of MOSFET switch Q2 is also connected to the inverting input of comparator U4.

Figure 14:
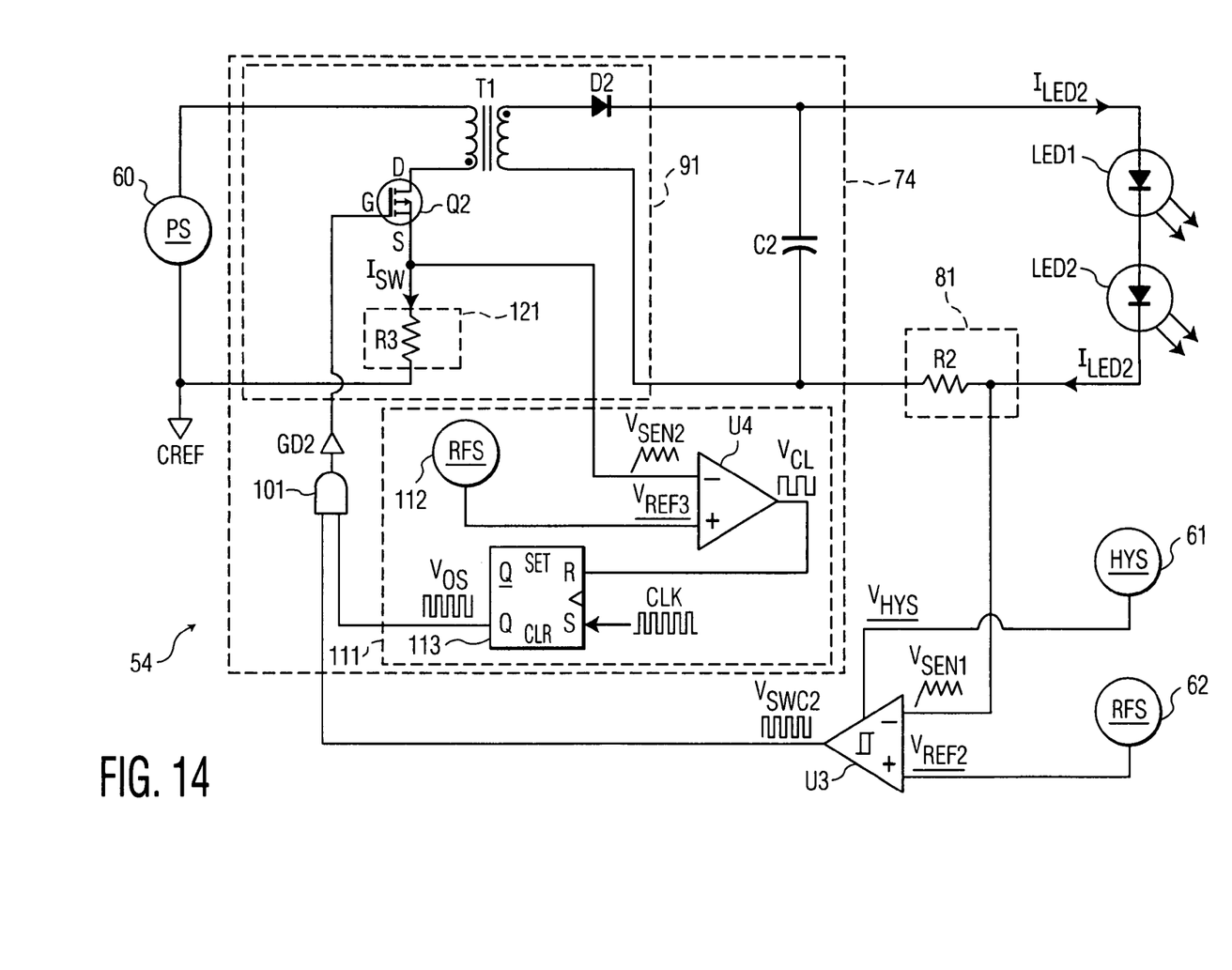
FIG. 14 illustrates a schematic diagram of a second embodiment of the LED current control circuit illustrated in FIG. 12.

FIG. 14 illustrates another circuit arrangement of cell 91 wherein a primary side of a transformer T1 has one end connected to power source 61 and the other end connected to drain terminal D of MOSFET switch Q2. A secondary side of transformer T1 has one end connected to diode D2, and the other end connected to capacitive output filter C2 and sense resistor R2.

For purposes of describing the invention, the LED network LED1, LED2 was illustrated as a series connection of LEDs.

In practice, a LED current control method and circuit of the present invention can control the LED current through any number of LEDs having any type of arrangement.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method for regulating a mean amperage of a LED current flowing through one or more LEDs, the mean amperage being an average of a peak amperage and a valley amperage of the LED current, said method comprising:
   establishing an upper trip voltage and a lower trip voltage as control crossover thresholds;
   establishing an LED current sensing voltage representative of a flow of the LED current through the one or more LEDs;
   controlling an increase of the LED current from the valley amperage to the peak amperage in response to each crossover of the lower trip voltage by the LED current sensing voltage in a negative direction; and
   controlling a decrease of the LED current from the peak amperage to the valley amperage in response to each crossover of the upper trip voltage by the LED current sensing voltage in a positive direction.

2. A LED current control circuit for regulating a mean amperage of a LED current flowing through one or more LEDs, the mean amperage being an average of a peak amperage and a valley amperage of the LED current, said circuit comprising:
   a LED current sensor operable to establish an LED current sensing voltage representative of the LED current flowing through the one or more LEDs;
   a hysteretic comparator operable to establish an upper trip voltage and a lower trip voltage as control crossover thresholds, said hysteretic comparator in electrical communication with said LED current sensor to receive the LED current sensing voltage,
   wherein said hysteretic comparator is operable to output a switching control voltage at a first logic level in response to each crossover of the lower trip voltage by the LED current sensing voltage in a negative direction, and
   wherein said hysteretic comparator is operable to output a switching control voltage at a second logic level in response to each crossover of the upper trip voltage by the LED current sensing voltage in a positive direction; and
   a switch-mode converter operable to control a flow of the LED current through the one or more LEDs, said switch-mode converter in electrical communication with said hysteretic comparator to receive the switching control voltage,
   wherein said switch-mode converter controls an increase of the LED current from the valley amperage to the peak amperage in response to the switching control voltage equaling the first logic level, and
   wherein said switch-mode converter controls a decrease of the LED current from the peak amperage to the valley amperage in response to the switching control voltage equaling the second logic level.

3. The LED current control circuit of claim 2,
   wherein said hysteretic comparator includes an inverting input, a non-inverting input, and a control input;

wherein the LED current sensing voltage is applied to the inverting input of hysteretic comparator;

wherein a reference voltage is applied to the non-inverting input; and wherein a hysteresis voltage is applied to the control input.

4. The LED current control circuit of claim 2, wherein said switch-mode converter includes:

a switch in electrical communication with said hysteretic comparator to be opened and closed as a function of the switching control voltage.

5. The LED current control circuit of claim 2, wherein said switch-mode converter includes an inductive output filter in electrical communication with the one or more LEDs.

6. The LED current control circuit of claim 2, wherein said switch-mode converter includes a capacitive output filter in electrical communication with the one or more LEDs.

7. The LED current control circuit claim 2, wherein said switch-mode converter includes:

a duty cycle oscillator operable to output an oscillating voltage;

a logic circuit in electrical communication with said hysteretic comparator to receive the switching control voltage and in electrical communication with said duty cycle oscillator to receive the oscillating voltage; and a switch in electrical communication with said logic circuit to be opened and closed as a function of the switching control voltage and the oscillating voltage.

8. The LED current control circuit of claim 7, wherein said switch-mode converter further includes:

a switching current sensor in electrical communication with said switch to output a switching current sensing voltage representative of a flow of a switching current through said switch, wherein said duty cycle oscillator is in electrical communication with said switching current sensor to output the oscillating voltage as a function of the switching current sensing voltage.

9. The LED current control circuit of claim 8, wherein said duty cycle oscillator includes:

a comparator in electrical communication with said switching current sensor to receive the switching current sensing voltage, said comparator operable to provide a switching current limit voltage as a function of a comparison of the switching current sensing voltage to a reference voltage representative of a maximum amperage of the switching current; and a bi-stable device in electrical communication to with said comparator to receive the switching current limit voltage, said bi-stable device operable to output the oscillating voltage as a function of a clock signal and the switching current limit voltage.

10. A LED current control circuit for regulating a mean amperage of a LED current flowing through one or more LEDs, the mean amperage being an average of a peak amperage and a valley amperage of the LED current, said circuit comprising:

a LED current sensor operable to establish an LED current sensing voltage representative of the LED current flowing through the one or more LEDs;

a hysteretic comparator operable to establish an upper trip voltage and a lower trip voltage as control crossover thresholds, said hysteretic comparator electrical communication with said LED current sensor to receive the LED current sensing voltage, wherein said hysteretic comparator operable to output a switching control voltage at a first logic level in response to each crossover of the lower trip voltage by the LED current sensing voltage in a negative direction, and wherein said hysteretic comparator is operable to output a switching control voltage at a second logic level in response to each crossover of the upper trip voltage by the LED current sensing voltage in a positive direction; and a switch-mode converter including means for controlling a flow of the LED current through the one or more LEDs as a function of the switching control voltage.

* * * * *